Sept. 4, 1934.    M. C. BOSWELL    1,972,074
PROCESS FOR SEPARATING SULPHUR DIOXIDE FROM GASEOUS MIXTURES
Filed Sept. 8, 1930
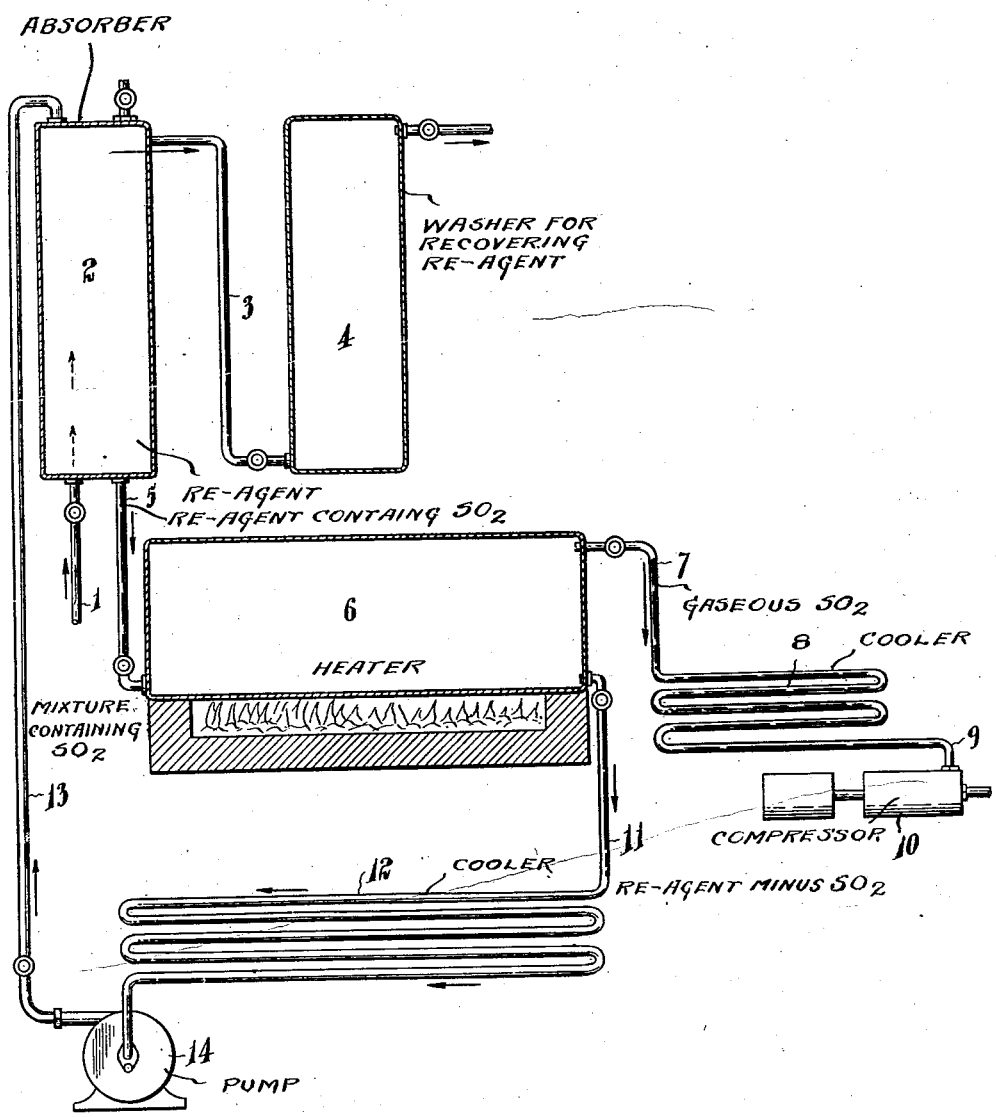
Inventor
M. C. Boswell
ATTY Patented Sept. 4, 1934

1,972,074

UNITED STATES PATENT OFFICE 1,972,074

PROCESS FOR SEPARATING SULPHUR DIOXIDE FROM GASEOUS MIXTURES

Maitland C. Boswell, Toronto, Ontario, Canada

Application September 8, 1930, Serial No. 480,450

1 Claim. (Cl. 23—178)

This invention relates particularly to the separation of sulphur dioxide from gaseous mixtures in which it is present in relatively small proportions.

It has been proposed to separate the sulphur dioxide by effecting its solution in water or some other liquid or solution. The high vapor pressure of sulphur dioxide and the slow rate at which it is absorbed by liquids, however, renders such processes troublesome in operation, as very large quantities of liquid must therefore be used.

My object, therefore, is to devise a method of separating the sulphur dioxide by means of which the sulphur dioxide may be removed rapidly and substantially completely, even from very dilute mixtures and with the use of a comparatively small quantity of vehicle.

I attain my object by employing as the vehicle for the removal of the sulphur dioxide a liquid reagent, or solution of a solid reagent, with which the sulphur dioxide actually combines but from which it may be afterwards readily dissociated by the action of heat.

The reagents I employ are the bases of the pyridine, quinoline, isoquinoline and acridine series and also their hydrogenation products as well as commercial bases containing them, such as the higher boiling fractions of the bases of coal tar and of bone oil. Of the pure bases quinoline and hydrogenated quinoline are, on account of their lower cost and high efficiency, the best adapted at present for use in the process.

I have found that dry quinoline will absorb considerable quantities of sulphur dioxide from a gaseous mixture when the percentage of sulphur dioxide is high but when the percentage is low the absorption is not sufficiently effective to be commercially practicable. I have further found, however, that quinoline containing water is capable, at ordinary atmospheric temperatures and pressures of very rapidly and completely removing sulphur dioxide from gaseous mixtures even at very low concentrations of sulphur dioxide in the gas.

The amount of sulphur dioxide absorbed by a given weight of quinoline does not depend on the partial pressure of the sulphur dioxide in the gas. That is a chemical reaction occurs between the quinoline-water complex and sulphur dioxide. The ratio of quinoline to sulphur dioxide in the compound formed as indicated by measurement is approximately two molecules of quinoline to one molecule of sulphur dioxide. This points to the formation of a normal sulphite of quinoline, the quinoline acting as a non-acid base. However, the possibility is not excluded of the formation of some addition product of quinoline or quinoline hydrate and sulphur dioxide or sulphurous acid.

I have found that various mixtures of quinoline and water and various concentrations of water vapor in the gas may be employed, a very convenient and efficient ratio of quinoline to water being secured by agitating quinoline and water at ordinary atmospheric temperature and separating mechanically the two layers of liquid formed on standing.

When the gaseous mixture containing sulphur dioxide is agitated with the quinoline and water, the sulphur dioxide is taken up and the solution becomes more or less viscous.

When water is used in the process I have found that a solution or suspension of the quinoline and water in glycerol, petroleum or other solvent or diluent medium of quinoline sulphite diminishes the viscosity of the reaction product with sulphur dioxide, and these diluting media may be used in the process.

The quinoline-water-sulphur dioxide reaction product gives off practically no sulphur dioxide below 70° C. and at atmospheric pressure. Above 70° C. the gases are given off more and more rapidly and at 100° to 110° C. the dissociation is so rapid that about three quarters of the sulphur dioxide absorbed may be recovered very quickly, the remainder being recoverable more slowly. The low vapor pressure of quinoline at the temperature of absorption (about 30° C.) maintains the amount of quinoline vapor in the exit gases at a very low value. This escaping quinoline is recovered in a washer containing dilute acid from which the quinoline can be recovered from time to time when sufficient has accumulated.

The process of this patent consists in passing the gas containing sulphur dioxide, preferably freed from dust and sulphur trioxide and cooled to a temperature preferably below 30° C., although higher temperatures may be used, through towers or scrubbers containing, or through which is passing, at a temperature preferably below 30° C. (although temperatures considerably higher may be used), the prepared reagent. The exit gases which contain a small amount of the vapor of the base used are passed through a tower or washer where the gas meets dilute acid, such as dilute sulphuric acid, or hydrochloric acid in order to remove the base. At intervals this acid solution of base is treated with lime or other inorganic base for the recovery of the organic base, or if sulphurous acid is used the organic base may be recovered by heating to expel the sulphur dioxide when the free organic base separates. The liquid from the washing tower or scrubber and holding the sulphur dioxide is run into a heater where it is heated to a sufficient temperature to drive off the sulphur dioxide, a temperature of 70°–110° C. being suitable at atmospheric pressure. The sulphur dioxide thus driven off passes into a cooler which serves two purposes, one, to cool the sulphur dioxide gas for the compressor to which the gas next passes, and second, to catch the small amount of base which escapes with the sulphur dioxide under certain conditions of working and which separates in the cooler as the reaction product of the base and sulphur dioxide or of base, water and sulphur dioxide. This base may be recovered from time to time. The sulphur dioxide may next pass to a compressor for collection as compressed gas or liquid sulphur dioxide. The base or base-water mixture is now made to flow through a cooler so as to lower its temperature to about 30° C. and is pumped into washing towers or scrubbers for the removal of sulphur dioxide from more gas.

By using several washing towers or scrubbers the waste gas containing sulphur dioxide can be run through one or more of these while the liquid saturated with sulphur dioxide is being run out of one or more other towers or scrubbers into the heater and while the sulphur dioxide is being recovered and the base or its solution is being cooled and made ready to be pumped back again into the towers or scrubbers. Or the process can be made continuous, cooled base being continuously pumped to the washing towers or scrubbers and the base containing sulphur dioxide being continuously run out of the absorbers into the heater.

The drawing shows diagrammatically a suitable lay out of a plant using one scrubber and one heater, broken arrows showing the flow of gas and solid arrows the flow of liquid.

Referring to the drawing, 1 is the pipe through which gaseous mixture containing sulphur dioxide is led to the absorber 2 containing the vehicle by which the sulphur dioxide is picked up. 3 is a pipe connecting the absorber 2 with a washer 4 in which any of the reagent carried over is recovered. By means of the pipe 5 the liquid containing the sulphur dioxide is led to the heater 6. From the heater 6 the gaseous sulphur dioxide is led, by means of the pipe 7, to the cooler 8, from which a pipe 9 leads to the compressor 10. The liquid from which the sulphur dioxide has been expelled is led by means of the pipe 11 to the cooler 12. From this cooler the liquid is returned to the absorber 2 through the pipe 13 in which is positioned the pump 14.

In those cases where complete removal of sulphur dioxide from the gaseous mixture is not essential the washer 4 may be dispensed with and the use of glycerol or its equivalent avoided. Under these conditions the gaseous mixture is passed through the absorber 2 containing water to which quinoline is added from time to time at such a rate as to always leave a surplus of sulphur dioxide content in the water, thus preventing the escape of quinoline with the gases passing over, which obviates the necessity of washing the escaping gas to recover the quinoline. Under these conditions some sulphur dioxide may pass over, the amount escaping depending on the rate of passage of the gas through the absorber, the rate of addition of quinoline and the degree of agitation in the absorber. However, by careful attention the concentration of sulphur dioxide in the water can be maintained at a low value and, as a consequence, the amount of sulphur dioxide present in the gaseous effluent is kept low.

What I claim as my invention is:

In a process of separating sulphur dioxide from gaseous mixtures the step which consists in bringing the gaseous mixture into intimate contact with a mixture of quinoline and water and a diluent medium miscible with quinoline sulphite.

MAITLAND C. BOSWELL.